United States Patent Office 2,910,140
Patented Oct. 27, 1959

2,910,140
PROCESS FOR PURIFYING CHLORINE

Franz Bencker, Freiburg, Fritz Overdick, Leverkusen-Bayerwerk, and Richard Schlee, Leverkusen, Germany, assignors to Farbenfabriken Bayer Aktiengesellschaft, Leverkusen, Germany, a corporation of Germany No Drawing. Application June 18, 1957
Serial No. 666,462

Claims priority, application Germany July 2, 1956

2 Claims. (Cl. 183—114.2)

Chlorine gas obtained by the electrolysis of alkali metal chloride solutions is generally contaminated with water vapor, ultra-fine droplets of alkali chloride brine and, to a small degree, with vapors of chlorinated hydrocarbons, such as hexachlorobenzene and hexachloroethane, formed by the action of hot chlorine gas on the graphite anodes themselves and also on the paraffin with which the anode rods and the sandstone cover of the electrolytic cells are impregnated; a further source seems to be the hard rubber covering of the cell walls.

For purification purposes, the chlorine gas is usually washed first of all with cold water. By this means, the main quantities of the water vapor and of the heavy volatile chlorinated hydrocarbons are condensed and a large part of the brine droplets are washed out.

However, even if the gas, before it is compressed with partial liquefaction, is passed through a glass wool filter and also through concentrated sulphuric acid for drying purposes, alkali metal chloride is still present therein as an ultrafine dust which is precipitated and accumulates to some degree in the pipelines, in the working parts of the compressors and in the liquid chlorine. Moreover, the organic impurities are to a large extent condensed by the compression and intermediate cooling and soil the cooling surfaces; the remainder of these compounds are dissolved in the liquefied chlorine and can be the cause of considerable interruption of operations when this chlorine is further treated.

It is true that the salt dust can be kept back almost completely in an obvious manner by means of tube filters, but the removal of the organic impurities requires special measures.

It has been found that the active carbon filters already known for the absorption of vapors of organic compounds are also capable of being used for the purification of chlorine if the active carbon filter is initially charged at a temperature of —33 to 65° C., preferably below 60° C., with chlorine gas and this treatment is continued until the carbon is saturated with chlorine. As a result of this preliminary treatment, it is possible to avoid the active carbon and parts of the apparatus burning in the chlorine atmosphere, whereas the carbon would be heated to red heat on immediate contact with large quantities of chlorine, owing to the heat of absorption of the gas.

It has moreover proved to be desirable that the active carbon filter should largely be freed from water prior to the first charging with chlorine, this being achieved by blowing dry air therethrough, because water on active carbon reacts with chlorine with considerable evolution of heat.

The invention is further illustrated by the following example without being restricted thereto.

Example

Chlorine gas obtained by electrolysis of an aqueous sodium chloride solution and containing 30 mg./cubic meter of sodium chloride in form of very fine droplets of brine and 40 mg./cubic meter of organic chlorine compounds besides varying amounts of water vapor is passed at a rate of 300 cubic meter/hour at a temperature of about 70° C. into a cooling and washing tower. In the cooling and washing tower the temperature of the gas is reduced to about 15 to 20° C. by washing with about 1000 liters/hours of water at about 15° C. The water vapor content of the chlorine is reduced to about 15 g./cubic meter, the organic chlorine compounds to about 30 mg./cubic meter and the brine droplets to about 10 mg. of NaCl/cubic meter.

In the second step, the chlorine gas is washed by means of concentrated sulfuric acid, whereby the water content of the chlorine gas is eliminated and the droplets of brine are converted to sodium chloride crystals. The chlorine gas containing the sodium chloride crystals in form of a very fine dust is passed through polyvinylchloride filter tubes whereby the sodium chloride is filtered from the gas which after this second purification step contains only organic chlorine compounds as impurities. The tube filter consists of a cylindrical vessel of a height of approximately 5 meters and a width of 2.3 meters. In the cylindrical vessel there are arranged 73 filter bags consisting of polyvinyl chloride fabric or glass fabric and each of a length of 4 meters and a width of 0.22 meter depending from a perforated plate in the upper part of said vessel.

The chlorine gas is then subjected to a third purification step by passing it through a vessel containing about 100 kg. of active carbon which is saturated with chlorine. The chlorine gas leaving the active carbon filter is substantially free from organic chlorine compounds and any other impurities. The active carbon loses its absorption capacity only after some months and is then replaced or regenerated. The saturation of the active carbon with chlorine is carefully performed by passing 100 to 150 liters of chlorine gas during one hour into 100 kg. of active carbon at a temperature of 16–18° C. for a period of about 25 to 30 hours.

We claim:

1. In the process of purifying chlorine gas produced by the electrolysis of an aqueous solution of an alkali metal chloride the improvement which comprises washing, cooling, drying and, removing solid particle material from the chlorine gas and thereafter removing from the gas organic chlorine compounds formed during the electrolysis of the alkali metal chloride by passing the chlorine gas through active carbon which has been saturated with chlorine at a temperature between about —33° and about 65° C.

2. In the process of purifying chlorine gas produced by the electrolysis of an aqueous solution of an alkali metal chloride and removing the water vapor, droplets of alkali chloride brine, alkali metal chloride dust and such organic chlorine compounds as are formed during the electrolysis of the alkali metal chloride, the improvement which comprises washing, cooling, drying and, removing solid particle material from the chlorine gas and thereafter removing from the gas the organic chlorine compounds formed during the electrolysis of the alkali metal chloride by passing the chlorine gas through active carbon which has been saturated with chlorine at a temperature between about —33° and about 65° C.

References Cited in the file of this patent
UNITED STATES PATENTS

| | | |
|---|---|---|
| 2,542,961 | Johnson et al. | Feb. 20, 1951 |
| 2,750,002 | Hooker et al. | June 12, 1956 |
| 2,800,197 | Wynkoop | July 23, 1957 |

OTHER REFERENCES

"Adsorption," by C. L. Mantell, McGraw-Hill Book Co., New York, 1945, page 12.